United States Patent
Baitinger et al.

(10) Patent No.: US 7,039,682 B2
(45) Date of Patent: May 2, 2006

(54) EXTENSION OF THE BOOTP PROTOCOL TOWARDS AUTOMATIC RECONFIGURATION

(75) Inventors: Friedemann Baitinger, Jettingen (DE); Kurt Heinrich Naegele, Weilheim (DE); Karlo Petri, Hildrizhausen (DE); Frank Scholz, Grafenau (DE)

(73) Assignee: International Business Machines Corporation, Armonk, NY (US)

( * ) Notice: Subject to any disclaimer, the term of this patent is extended or adjusted under 35 U.S.C. 154(b) by 802 days.

(21) Appl. No.: 10/020,659

(22) Filed: Dec. 12, 2001

(65) Prior Publication Data

US 2002/0078340 A1 Jun. 20, 2002

(30) Foreign Application Priority Data

Dec. 15, 2000 (EP) .................................. 00127578

(51) Int. Cl.
*G06F 15/16* (2006.01)
(52) U.S. Cl. .................... 709/208; 709/220; 709/228; 709/249
(58) Field of Classification Search ............... 709/220, 709/221, 222, 223, 224, 228, 245
See application file for complete search history.

(56) References Cited

U.S. PATENT DOCUMENTS

| 5,758,342 | A |   | 5/1998 | Gregerson ................ 707/10 |
| 5,872,968 | A | * | 2/1999 | Knox et al. ................ 713/2 |
| 6,009,474 | A | * | 12/1999 | Lu et al. ................. 709/245 |
| 6,070,187 | A | * | 5/2000 | Subramaniam et al. ..... 709/220 |
| 6,170,008 | B1 | * | 1/2001 | Bahlmann et al. ........ 709/220 |
| 6,334,149 | B1 | * | 12/2001 | Davis et al. ............. 709/219 |
| 6,490,677 | B1 | * | 12/2002 | Aguilar et al. ............. 713/1 |
| 6,507,869 | B1 | * | 1/2003 | Franke et al. ............ 709/224 |
| 6,578,074 | B1 | * | 6/2003 | Bahlmann ................ 709/222 |
| 6,587,468 | B1 | * | 7/2003 | Dos Santos et al. ........ 370/401 |
| 6,601,096 | B1 | * | 7/2003 | Lassiter, Jr. ............. 709/222 |
| 6,735,692 | B1 | * | 5/2004 | Murphrey et al. ........... 713/1 |
| 6,810,478 | B1 | * | 10/2004 | Anand et al. ............. 713/2 |
| 6,871,210 | B1 | * | 3/2005 | Subramanian ............ 709/203 |

* cited by examiner

*Primary Examiner*—Zarni Maung
*Assistant Examiner*—Van Nguyen
(74) *Attorney, Agent, or Firm*—John E. Campbell; Floyd A. Gonzalez (57) ABSTRACT

The present invention relates to a method and system for providing reconfiguration of network elements after a failure of such an element. A method for managing network configuration data, i.e., usable for automatic reconfiguration of server computers (16A,16B), is disclosed in which location and current status information about a client or controller computer (14A . . . 14C) is sent out such that a respective server type computer (16A,16B) may receive it and automatically reconfigure itself after temporary disruption.

36 Claims, 4 Drawing Sheets

FIG. 4

EXTENSION OF THE BOOTP PROTOCOL TOWARDS AUTOMATIC RECONFIGURATION

BACKGROUND OF THE INVENTION

The present invention relates to computer network communication techniques. In particular it relates to a method and system for providing reconfiguration of network elements after a failure of such an element.

The present invention is generally applicable in computer networks comprising a plurality of node computers.

Particular additional advantages can be profited from when said plurality of node computers has some inner structure of 'competence distribution', in particular a structure in which a first type of serviced computers, in particular embedded controllers, and a second type of server computers, exist in a non-public network, closed network system.

The present invention will next be discussed with the particular prior art being disclosed in the RFC1542 specification because it describes a client server communication protocol which can be well used with a hardware environment schema as sketched out above, where the first type of (client) computers are diskless computing units, and the second type computers are the respective servers which are provided with some permanent storage facility.

Within the Internet domain the BOOTP protocol has been architected by Request for Comment RFC 1542 to service diskless computer systems by supplying an executable load image. A so-called boot server host is attached to the same physical LAN that also connects the diskless, mostly embedded controller computer nodes. When the embedded nodes receive stand-by power they typically load an initial bootstrap code—mostly called BIOS (Basic Input Output Service)—from flash ROM and start executing it. In the course of this execution important information that personalizes this local node is read from special hardware interfaces. This information is usually divided into two categories:

(I). Data that is required to service the BOOTP protocol, for instance and most important for the sake of the present invention the unique network MAC address of the first type computer.

(II). Vendor specific data that is unique to the environment of the implementation.

The data of type (II) is typically used to supply information that is required to build up a configuration encompassing all embedded nodes in a subject system. The BIOS code starts sending out BOOTP messages over one or all of its local LAN interfaces. Sending is repeated upon expiration of an appropriate timeout until a reply is received from a boot server. The sending is performed as a "limited broadcast" on the LAN by supplying a MAC address with all bits turned on. Such a message is restricted to the physical LAN where the omitting interface is attached to. It will not be routed into other LANs by means of IP routing.

These message contain data of both types (I) and (II). These BOOTP messages will be intercepted by the boot server host, i.e., the above mentioned second type of (server) computer. Based on the data content the boot server decides whether it is entitled to serve this particular requester. The typical boot server accesses a data file, e.g., the ("/etc/bootptab" file) that contains information about "acceptable" requesters. If accepted a dialogue between the boot server program and the target BIOS code will be conducted. At the end of this dialogue a loadable code image will be shipped to the embedded node, and this image will be started then.

In parallel the data content being sent with the BOOTP message will be exploited by the boot server program in a way that supports the construction of a configuration consisting of all the acquired data from all nodes. This configuration is the essential data set that is typically maintained by a configuration server on the subject boot server host.

The regular scenario of the prior art BOOTP RFC 1542 ends here.

But in an environment that features redundant network structures with redundant boot servers that are an integral part of a system with common power supply structures for server and client nodes, and an a priori unknown number of requesting client computer nodes with unknown identity new problem areas are opened up. Being interchangeably attached to a common power supply structure enforces the implementation of a dynamic network configuration for the boot servers based on their relative location within the network structure. This requirement fosters increased availability and flexibility by avoiding 'single point of failures' (SPOF) within such a system.

Once there is more than one, i.e., a redundant boot server host, each embedded node is assumed to send out its BOOTP message over all LAN interfaces in order to potentially reach at least one boot server. More than one boot server may send a reply to such a BOOTP request. Then the requesting embedded node decides with which server it executes the boot dialogue. From now on the other servers are excluded from further information. The crucial problems to be solved are:

First, the other boot servers need to be informed about the progress of the boot and startup process of each embedded controller, even if they have not participated in the boot dialogue.

Second, the re-attaching server hosts—be it for the first or a later time—have to determine their location relative to the network structure. Thus, it is difficult for it to determine if a server host (SC) is connected to the left or to the right side of the network.

A solution to the first problem is fundamental for the construction of a configuration by the configuration servers running "behind" the boot server on these redundant server hosts. The underlying problem is equivalent to the problem of re-attaching a boot or configuration service to a network of running embedded controllers and enabling it to re-construct the configuration.

The solution of the second problem determines the IP definitions according to a predefined physical network design this server has to apply to its local LAN interfaces in order to be able to participate in the IP network traffic, i.e., to be able to send and receive IP packets from running embedded nodes.

SUMMARY OF THE INVENTION

It is thus an object of the present invention to provide for an improved reconfiguration method in redundantly provided network structures.

A method for managing network configuration data, i.e., usable for automatic reconfiguration of server computers, is disclosed in which the network comprises a plurality of first type computers having a limited function range excluding at least a self-boot process and being bootable by a second type computer having a respective extended function range. According to the present invention location information about the first type computer, mostly a client or controller computers, is sent out such that a respective second type computer may receive it. When this is done automatically by the first type computers, the information flow between the controller and server computer is always up-to-date and can thus be maintained easily by the server supposed it collects said first-type-computer-related location and/or status information by evaluating the messages sent out by the first type computers, and storing said location and/or status information thereafter in an adequate storage, as for example a dedicated kind of database.

By that measure and when it reads out the collected information a redundantly provided server can take over the role of a first server in case of its break-down without rebooting all controllers it must provide service to.

When a plurality of per se unknown first type controllers is present in the network, or its presence changes dynamically in time, this is an efficient way to guarantee that the server knows all essential information about the clients it has to provide with service.

When said location information is included into boot messages usable between the first type and second type computers according to a predetermined network communication protocol, like BOOTP, for example and in a preferred way, the additional advantage results that no separate message format needs to be defined for said information transfer mentioned above.

When current status information about the first type computer is included into informational boot (Infoboot) messages having the same format as said boot messages, and they are sent periodically into the network for enabling a server to use said information for determining the server's own network location, then, after a successful boot of the first type computer the second type server computer can easily, i.e., quasi automatically reattach to the network and reconfigure its network interfaces, e.g., LAN interfaces after e.g., a temporary disruption by examining the contents of these Infoboot messages, for instance, determining the interface number that was used by the omitting first type computer node for sending this received message.

Thus, the second type server computer can easily reattach to the network independent from the state of the first type computer nodes—they can be in non-booted or booted state at the time of the reattachment. Considered from the perspective of the attaching second type computer node this computer is executing the same steps whether it has crashed before or whether the entire system has been started from scratch.

The concept disclosed herein can thus advantageously be used for keeping redundantly provided second type computers in a state consistent to each other and consistent to a respective status of a first type computer.

The present invention is based on the approach that first, the mechanics of the prior art boot server that is based on predefined information, for example, hosted at the server host in a dedicated database, has to be turned around into a different type of boot server that supports the construction of a configuration from "unknown" parts. Second, the required redundancy forces the system design to deal with the consistency of the information maintained by all acting boot servers.

Further, the present invention is advantageously applicable when an increased availability—nearly permanent— of network components is required. This is in particular the case in redundantly configured network systems where in particular the server type computers are provided redundantly, e.g., twice for a predetermined number of serviced computers.

Further, the inventive concept provides an universally usable approach which can be used both, for the initial startup of the client-server environment, and during a later operational phase—without making any distinctions or modifications in the respective program code on the server side or, e.g., in an hard-wired logic running on the client.

Finally, the inventive concept can easily be applied in network scenarios in which the number of operating client systems varies in time, because such dynamic behavior is managed automatically—by the required crucial administration information being issued by the dynamically changing clients themselves to their associated server computers which just need to pick up said information and update a respective administration database.

BRIEF DESCRIPTION OF THE DRAWINGS

These and other objects will be apparent to one skilled in the art from the following detailed description of the invention taken in conjunction with the accompanying drawings in which.

DESCRIPTION OF THE PREFERRED EMBODIMENT

The embodiment described next is based on the following concepts:

1. Vendor-specific extensions to the content of a BOOTP are defined. These data may contain "location" information, in particular left or right side detection. Only a subset of the embedded nodes may be capable of supplying this information.
2. A variant of a BOOTP message called an "informational BOOTP", or in short, InfoBOOT message is defined that is compatible in format to the original BOOTP specification. An additional flag designates it as an InfoBOOT message. Additional vendor-specific data is defined for this type of message.
3. Original BOOTP message are still sent out by the BIOS. A server host waits until it receives a BOOTP or InfoBOOT containing location data. Based on this data it configures its LAN interfaces. All other messages are discarded until this point in time. This specifically solves the second problem mentioned above.
4. InfoBOOT messages are sent out when the embedded controller has successfully completed its basic startup by having loaded the received image and entered operating system and/or application code.
5. These InfoBOOT messages are sent out via all LAN interfaces that are available. This achieves that the "silent" boot and configuration servers are informed about this successfully started embedded node. This specifically solves the first problem mentioned above.
6. These InfoBOOT messages can take advantage of higher level TCP/IP features that are not available to BIOS code. They can be sent as limited broadcasts as BIOS-level BOOTP messages or sent as UDP unicasts by means supplying accurate IP target addresses. In the latter case the are subject to IP routing. In case of broken LAN interfaces routing can be a means to deliver a message via "routed" paths using intermediary nodes as relay nodes. The degree of availability is increased when these InfoBOOT messages are sent out using both ways.

7. In order to receive these InfoBOOT messages a server host does not have to set up a different listening port than the one used for the real BOOTP messages. Because both message types are compatible by format they can be accepted by the same boot server program.

By the concept as summarized above both of the above mentioned problems are solved.

In brevity each embedded controller runs through the following steps or states:
1. Get stand-by power.
2. Execute BIOS.
3. Send out BOOTP message periodically over all LAN interfaces.
4. Receive reply from any boot server, and obtain a load image from a server.
5. Start up load image.
6. Send out InfoBOOT message continuously over all LAN interfaces.

Based on this inventive approach a boot server may reconnect at any time later to the network and listen for the InfoBOOT message to keep it informed.

The inventive concepts are explained in here with the help of a redundant network structure that features a "two-dimensional" design for increased system availability requirements. The invention can be easily extended to a "higher-dimensional" design by providing more physical networks and LAN interfaces to first type nodes.

Figure 1:
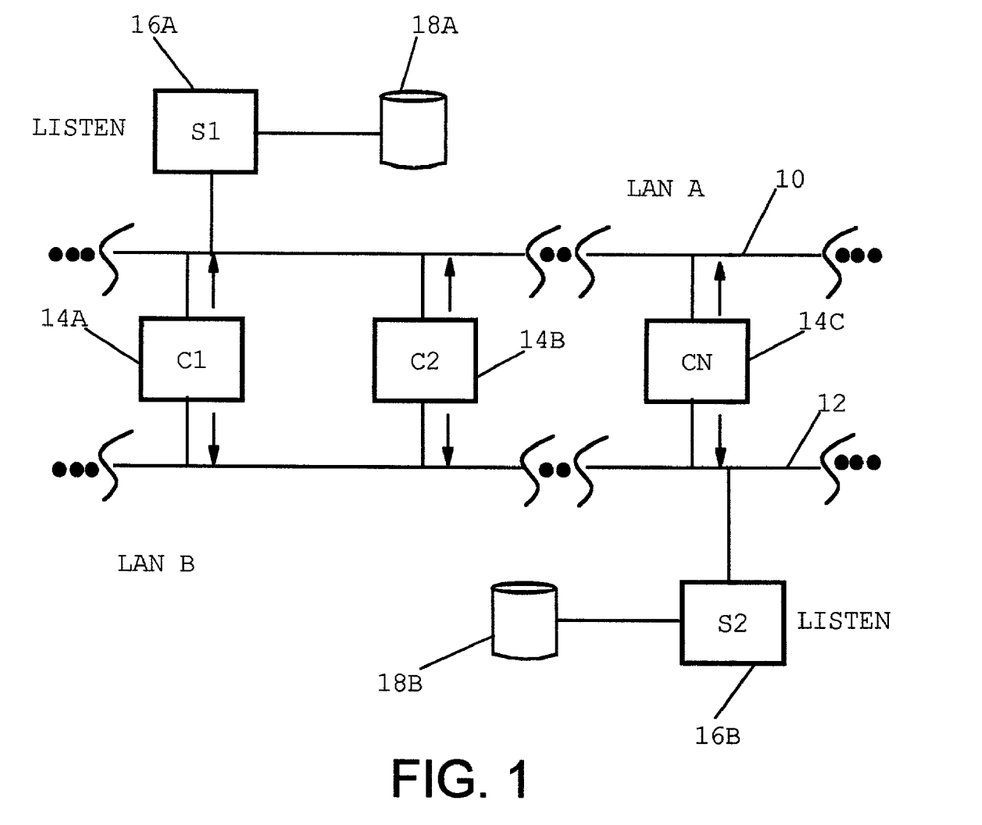
FIG. 1 is a schematic block diagram showing the most essential structural elements in a network system in which redundant servers are present.

With general reference to the figures and with special reference now to FIG. 1 in the network environment depicted in FIG. 1 a first local area network A having the reference sign 10, and a second local area network B (LAN B) having the reference sign 12 is depicted.

A plurality of first type client computers C1, C2, . . . CN, denoted as 14A, 14B, . . . 14C are depicted to be connected via respective LAN-interfaces each to both of the depicted networks 10 and 12.

In LAN A said plurality of client computers 14 is serviced by a dedicated network server computer S1, denoted with reference sign 16A which in turn has a data base 18A associated and connected with it into which the relevant network configuration information concerning the operation of the number of clients 14 are maintained.

An analog situation is depicted in the bottom part of FIG. 1, where a second server S2 having the reference sign 16B is connected to LAN B. Said second server S2 has an analog database 18B for the same kind of reasons. As should reveal from the above introduction a server pair S1, S2 exists in order to provide for some degree of redundancy for increasing the operability of the client operation C1, C2 . . . CN and avoiding said single point of failures (SPOFs) on the level of server nodes.

As mentioned already above, said client computers 14 are so-called embedded controllers which are diskless computing units with a reduced degree of functionality and which are used preferably for a single dedication, for example in order to control and monitor the operation of any kind of post-connected hardware device.

In the network situation discussed in here a particular case of reduced client functionality is present. This is the reason amongst cost saving, why the controllers 14 are diskless devices. They use a flash-ROM for start up themselves and are booted into their desired operational status by receiving some load image via one of the two networks from one of the two servers.

Figure 2:
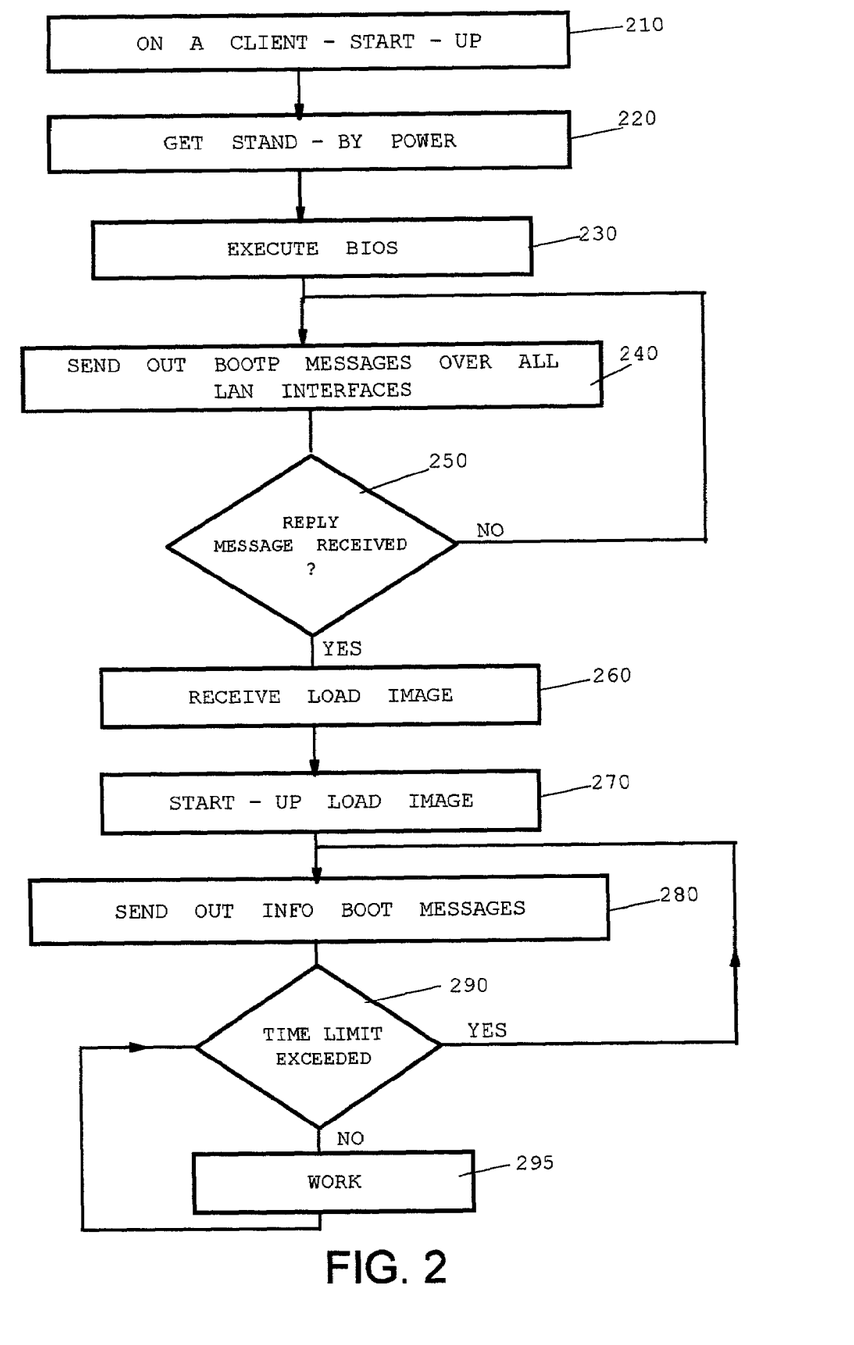
FIG. 2 is a schematic block diagram showing the essential client steps according to one aspect of the inventive reconfiguration method.

With reference now to FIG. 2 a situation is depicted in which one of such client computing units 14 starts up, step 210. For performing this it is branched, i.e. connected with a power connection, for example a standby power, step 220. This triggers the client to execute the BIOS program out of its Flash-ROM, step 230.

Thereafter a client sends out BOOTP messages comprising at least its unique network address, step 240, over both LAN interfaces into LAN A and LAN B, see back to FIG. 1. The fact of sending is symbolized with the arrows depicted near the clients 14. The client waits now until the actual boot process is triggered by one of the both server computers 16A, or 16B, respectively.

In such a case a client 14 receives a reply message at some point in time, step 250. It should be noted, that the BOOTP messages are sent out repeatedly by the client, see the branch back from decision 250 to step 240.

Then, the client receives a load image, step 260, in the reply message and is enabled therewith to start up the load image, step 270, and to begin its regular, intended operation.

According to the inventive embodiment disclosed in here the client sends out periodically the so-called info BOOT messages, step 280, in order to inform any of the servers 16 about all status information which is specific for a respective client and—which is of particular interest for automatic reconfiguration of a respective server 16—it sends out network location information, for example its MAC address assigned to the LAN interface that was used for sending this message together with the logical number of that said LAN interface, to determine the left/right or equivalent, LAN A/B attachment of the receiving server, which describes the specifics of the client location in both networks, LAN A and LAN B. Depending on the requirements of an actual implementation any additional information that can be retrieved from hardware may be added to this location-type information.

According to the present invention for these info BOOT messages the same format is used as it was used for the BOOT messages. Said sending process is repeated periodically with a standard prior art time-out mechanism, as reveals from decision 290. If a respective time limit has not yet exceeded, see the NO-branch, the embedded controller continues its normal operation, i.e. continues with its work at step 295. In order to send repeatedly the info BOOT messages it is branched back to decision 290 and step 280, respectively.

Figure 3:
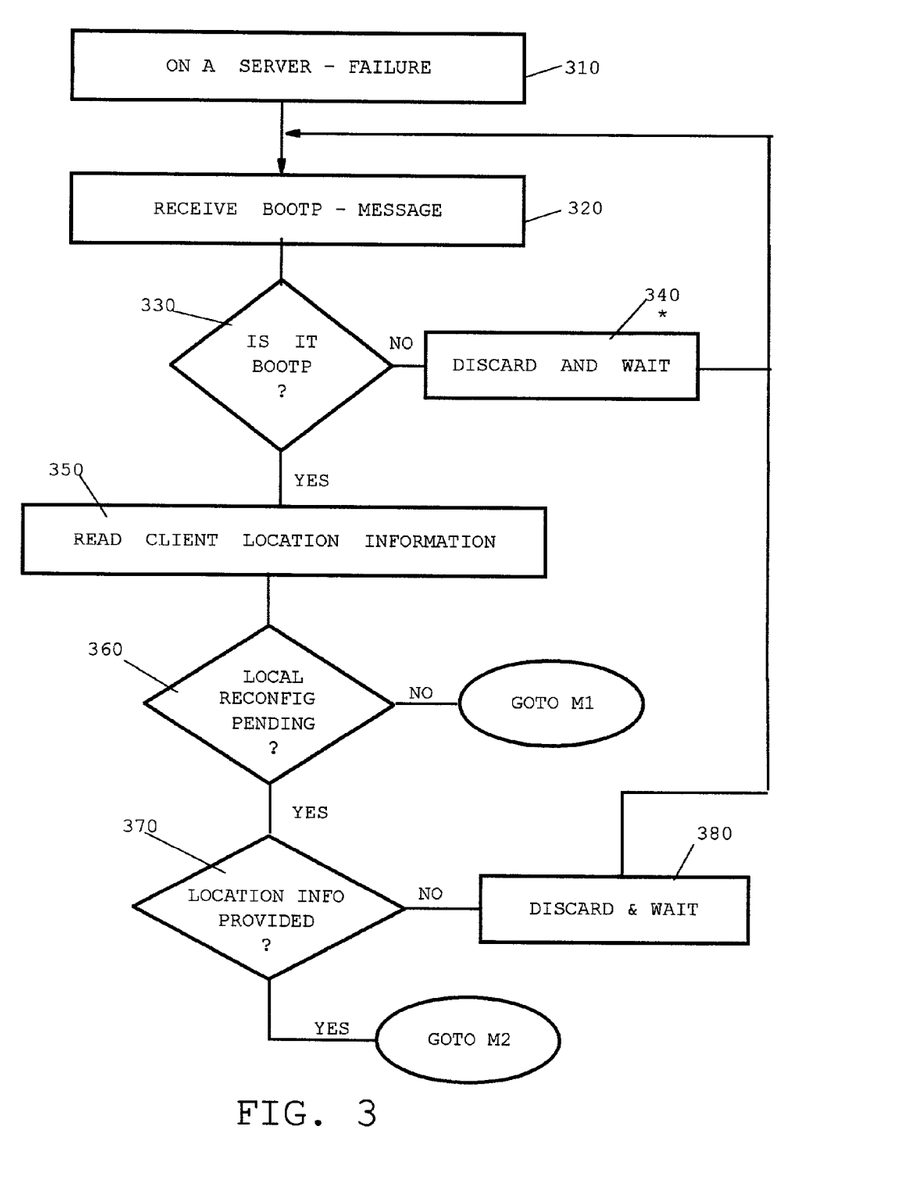
FIGS. 3,4 is a schematic block diagram showing the essential server steps according to the other aspect of the inventive reconfiguration method.
Figure 4:
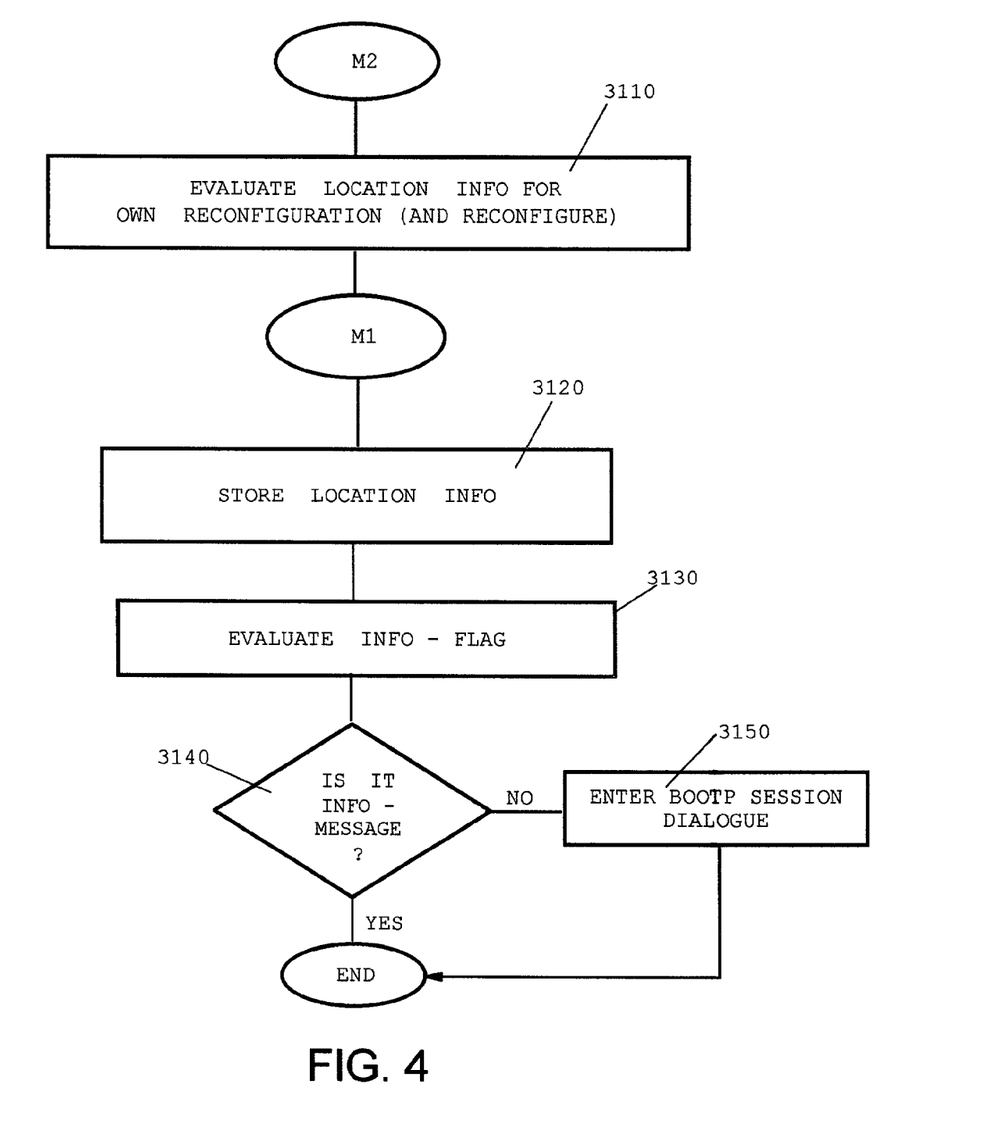

With reference now to FIG. 3 and FIG. 4 the essential steps performed by the server computer in cooperation with the steps described above with reference to FIG. 2 are described in more detail next below. Hereby a situation is chosen in which one server has run on a failure and returns without not knowing yet in which state the first type computer nodes are in, see step 310.

The operation will be continued according to the present embodiment by the other, redundantly provided server in order to provide for permanent operation of the embedded controllers. But without a redundantly provided server the same can be done after a restart/repair of the single server.

After a system restart of the server which has run into the failure the following steps are performed by the inventive code installed on either the second server and the first server:

In a first step 320 the server which had a breakdown restarts again and begins operating. It receives first a message sent through the network by an embedded controller, see step 280, FIG. 2. Said message is checked whether it is a BOOTP message, or not. If not, the message is discarded, step 340, and the server waits for a new message to come in. Thus, it is branched back to step 320. According to a preferred aspect of the present invention the server is now enabled to read the location information about the client which sent out said message, in the YES-branch of decision 330, step 350.

Then the server checks if it requires the location information in order to reconfigure its LAN interfaces, decision 360. If it has been done already upon receipt of a previous message, it continues at label M1 in FIG. 4. Otherwise as the result of the YES-branch of decision 360, it checks if said message did contain useful location information. If not as the result the NO-branch of decision 370, it discards said message at step 380 and returns to wait position 320. If the YES-branch of decision 370 is taken then the server continues at label M2 in FIG. 4.

Upon label M2 in FIG. 4 the location information is finally evaluated and used for reconfiguration of local LAN interfaces, step 3110. Any subsequent tests of decision 360 will now evaluate to the NO-branch. Upon label M1 in FIG. 4 the location and other client information will now be stored in databases 18A or 18B, respectively, step 3120. Thus, the data base 18 which was empty after the breakdown of the server is refilled continuously by receiving and evaluating the location information specified in the plurality of info BOOT messages received by the server. This information can be used for achieving an automatic reconfiguration of the breakdown server. In order to receive said plurality of subsequently incoming info BOOT messages from other client computers 14 it is branched back to step 320 when the END label has been reached.

As the last step in FIG. 4 the Info Boot flag is evaluated, step 3130. If decision 3140 yields the YES-branch, the server has completed the evaluation of said boot message. If decision 3140 yields the NO-branch the said boot message has requested a real boot image, and the prior art conventional boot response dialogue will be entered at step 3150 to complete processing of said boot message.

When the data base is full, or, it is provided with a sufficient degree of information the server which had had the breakdown is able the re-take the control for the other server, in case this should be required when the other server breaks down.

Thus the classical prior art information flow is inversed: In here, the client computers provide one or more server computers with its location and current status information.

Next, some details about the BOOTP protocol and data formats are given for the purpose of completeness.

In the above described preferred embodiment the Bootstrap protocol (BootP) is used. Other protocols might be used instead whenever this is required.

The BOOTP message format defines the above mentioned vendor specific field as a 64-byte data area reserved for vendor data to be exchanged. This field is used for setting the INFO flag which is evaluated by the servers according to inventive concept.

Thus, the present invention represents a large step forward to automatic reconfiguration of server computers in the above mentioned network situations.

In the foregoing specification the invention has been described with reference to a specific exemplary embodiment thereof. It will, however, be evident that various modifications and changes may be made thereto without departing from the broader spirit and scope of the invention as set forth in the appended claims. The specification and drawings are accordingly to be regarded as illustrative rather than in a restrictive sense.

The present invention can be realized in hardware, software, or a combination of hardware and software. A reconfiguration tool according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the client or server specific steps of the methods described herein.

The present invention can also be embedded in a computer program product, which comprises all the features enabling the implementation the respective steps of the methods described herein, and which—when loaded in one or more computer systems—is able to carry out these methods.

Computer program means or computer program in the present context mean any expression, in any language, code or notation, of a set of instructions intended to cause a system having an information processing capability to perform a particular function either directly or after either or both of the following:

a) conversion to another language, code or notation; and b) reproduction in a different material form.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. A method for the reconfiguration of a network in the event of a network failure wherein configuration data may have been lost, the network comprising a plurality of first type computers having a limited function range excluding at least a self-boot process and being bootable by a second type computer having a respective extended function range, said method comprising:

sending location information about the first type computer such that a respective second type computer may receive it;

responsive to said location information, booting said first type computer under the control of said second type computer;

periodically sending configuration information from said first type computer to said second type computer; and in the event said second type computer fails such that configuration information of said network may have been lost, restarting said second type computer and collecting configuration information from the configuration information periodically sent from said first type computer to said second type computer, thereby enabling said network to be reconfigured.

2. The method according to claim 1 in which said location information is included into boot messages usable between first type and second type computers according to a predetermined network communication protocol.

3. The method according to claim 2 wherein said configuration information periodically sent from said first type computer to said second type computer is in Infoboot messages and further comprising:

including current status information about the first type computer into said Infoboot messages having the same format as said boot messages; and periodically sending current status information in said Infoboot messages after a successful boot of the first type computer.

4. The method according to claim 3 further comprising providing a flagging means in said boot message for distinguishing between said boot message and said Infoboot message.

5. The method according to claim 1 wherein said location information is included into boot messages according to the BootP protocol.

6. A method for the reconfiguration of a network in the event of a network failure wherein configuration data may have been lost, the network comprising a plurality of first type computers having a limited function range excluding at least a self-boot process and being bootable by a second type computer having a respective extended function range, said method comprising:

collecting first-type-computer-related location and/or status information from a plurality of locations in the network by evaluating messages sent out by the first type computers;

storing said location and/or status information;

periodically sending said first-type-computer-related information from said first type computers to said second type computer; and in the event said second type computer fails such that said location and/or status information may have been lost, restarting said second type computer and collecting and storing said location and/or status information periodically sent from said first type computers to said second type computer after the failure of said second type computer, thereby enabling said network to be reconfigured.

7. The method according to claim 6 wherein said second type computer is a server, and further comprising using the location information for determining the server's own network location.

8. The method according to claim 7 further comprising collecting said information in a dedicated database.

9. The method according to claim 8 further comprising setting up a network configuration description according to the stored information.

10. The method according to claim 9 further comprising, after a second-type-computer-related operation disruption, evaluating current status and for location information associated with said first type computers before other messages.

11. The method according to claim 6 further comprising consistently operating second type server computers serving first type embedded controller computers in an enterprise network.

12. The method according to claim 6 further comprising operating second type server computers serving first type embedded controller computers in a computer-controlled industry plant.

13. An apparatus for the reconfiguration of a network in the event of a network failure wherein configuration data may have been lost, said apparatus comprising:

a plurality of first type computers having a limited function range excluding at least a self-boot process;

a second type computer having a respective extended function range, said first type computers being bootable by said second type computer;

a transmitter sending location information about the first type computer such that a respective second type computer may receive it;

a booting protocol responsive to said location information for booting said first type computer under the control of said second type computer;

said transmitter periodically sending configuration information from said first type computer to said second type computer; and a restarting facility for restarting said second type computer in the event said second type computer fails such that configuration information of said network may have been lost, said restarting mechanism for restarting said second type computer and collecting configuration information from the configuration information periodically sent from said first type computer to said second type computer, thereby enabling said network to be reconfigured.

14. The apparatus according to claim 13 in which said location information is included into boot messages usable between first type and second type computers according to a predetermined network communication protocol.

15. The apparatus according claim 14 wherein said configuration information periodically sent from said first type computer to said second type computer is in Infoboot messages and further comprising:

a facility including current status information about the first type computer into said Infoboot messages having the same format as said boot messages; and a facility periodically sending current status information in said Infoboot messages after a successful boot of the first type computer.

16. The apparatus according to claim 15 further comprising a flag in said boot message for distinguishing between said boot message and said Infoboot message.

17. The apparatus according to claim 13 wherein said location information is included into boot messages according to the BootP protocol.

18. An apparatus for the reconfiguration of a network in the event of a network failure wherein configuration data may have been lost, the network comprising a plurality of first type computers having a limited function range excluding at least a self-boot process and being bootable by a second type computer having a respective extended function range, said apparatus comprising:

An evaluator collecting first-type-computer-related location and/or status information from a plurality of locations in the network by evaluating messages sent out by the first type computers;

a memory storing said location and/or status information;

a transmitter in said first type computers periodically sending said first-type-computer-related information from said first type computers to said second type computer; and a restart facility in said second type computer for restarting said second type computer in the event of a failure such that said location and/or statue information may have been lost, said restart facility collecting and storing said location and/or status information periodically sent from said first type computers to said second type computer after the failure of said second type computer, thereby enabling said network to be reconfigured.

19. The apparatus according to claim 18 wherein said second type computer is a server, and further comprising using the location information for determining the server's own network location.

20. The apparatus according to claim 19 further comprising said evaluator collecting said information in a dedicated database.

21. The apparatus according to claim 20 further comprising setting up a network configuration description according to the stored information.

22. The apparatus according claim 21 further comprising, after a second-type-computer-related operation disruption, evaluating current status and/or location information associated with said first type computers before other messages.

23. The apparatus according to claim 18 further comprising consistently operating second type server computers serving first type embedded controller computers in an enterprise network.

24. The apparatus according to claim 18 further comprising operating second type server computers serving first type embedded controller computers in a computer-controlled industry plant.

25. A program product for the reconfiguration of a network in the event of a network failure wherein configuration data may have been lost, the network comprising a plurality of first type computers having a limited function range excluding at least a self-boot process and being bootable by a second type computer having a respective extended function range, said program product comprising:

a computer readable medium having recorded thereon computer readable program code means for performing the method comprising:
sending location information about the first type computer such that a respective second type computer may receive it;
responsive to said location information, booting said first type computer under the control of said second type computer;
periodically sending configuration information from said first type computer to said second type computer; and
in the event said second type computer fails such that configuration information of said network may have been lost, restarting said second type computer and collecting configuration information from the configuration information periodically sent from said first type computer to said second type computer, thereby enabling said network to be reconfigured.

26. The program product according to claim 25 in which said location information is included into boot messages usable between first; type and second type computers according to a predetermined network communication protocol.

27. The program product according claim 25 wherein said configuration information periodically sent from said first type computer to said second type computer is in Infoboot messages and said method further comprises:
including current status information about the first type computer into said Infoboot messages having the same format as said boot messages; and
periodically sending current status information in said Infoboot messages after a successful boot of the first; type computer.

28. The program product according to claim 27 wherein said method further comprises providing a flagging means in said boot message for distinguishing between said boot message and said Infoboot message.

29. The program product according to claim 25 wherein said location information is included into boot messages according to the BootP protocol.

30. A program product for the reconfiguration of a network in the event of a network failure wherein configuration data may have been lost, the network comprising a plurality of first type computers having a limited function range excluding at least a self-boot process and being bootable by a second type computer having a respective extended function range, said program product comprising:

a computer readable medium having recorded thereon computer readable program code means for performing the method comprising:
collecting first-type-computer-related location and for status information from a plurality of locations in the network by evaluating messages sent out by the first type computers;
storing said location and/or status information;
periodically sending said first-type-computer-related information from said first type computers to said second type computer; and
in the event said second type computer fails such that said location and for status information may have been lost, restarting said second type computer and collecting and storing said location and lot status information periodically sent from said first type computers to said second type computer after the failure of said second type computer, thereby enabling said network to be reconfigured.

31. The program product according to claim 30 wherein said second type computer is a server, and said method further comprises using the location information for determining the server's own network location.

32. The program product according to claim 31 wherein said method further comprises collecting said information in a dedicated database.

33. The program product according to claim 32 wherein said method further comprises setting up a network configuration description according to the stored information.

34. The program product according claim 33 wherein said method further comprises, after a second-type-computer-related operation disruption, evaluating current status and/or location information associated with said first type computers before other messages.

35. The program product according to claim 25 wherein said method further comprises consistently operating second type server computers serving first type embedded controller computers in an enterprise network.

36. The program product according to claim 25 wherein said method further comprises operating second type server computers serving first type embedded controller computers in a computer-controlled industry plant.

* * * * *